United States Patent Office 2,766,029
Patented Oct. 9, 1956

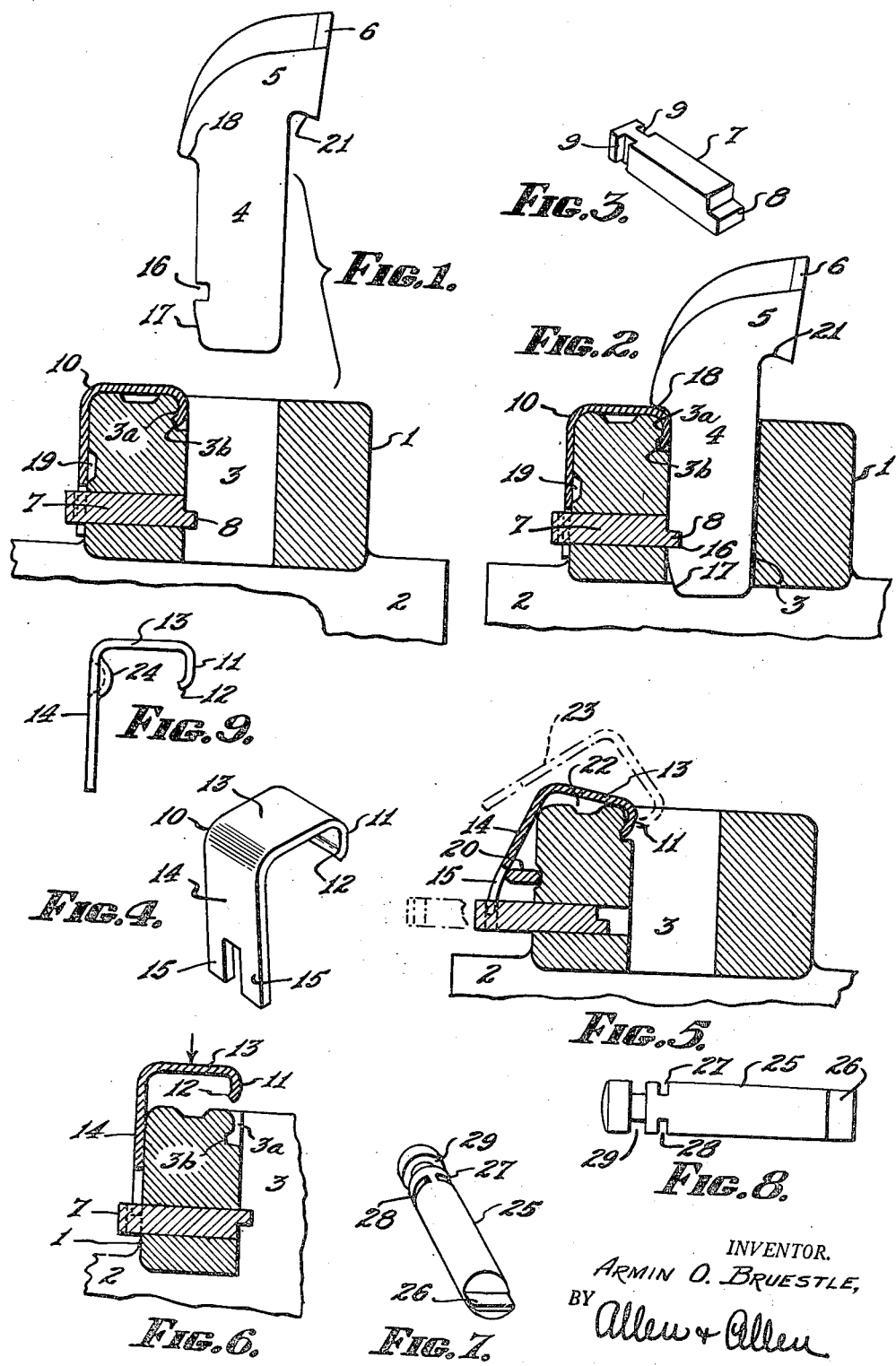

2,766,029

ADJUSTABLE AND RENEWABLE MOUNTING OF CUTTER BITS IN CUTTER CHAIN SOCKETS

Armin O. Bruestle, Cincinnati, Ohio, assignor to The Cincinnati Mine Machinery Company, Cincinnati, Ohio, a corporation of Ohio Application April 23, 1954, Serial No. 425,116

17 Claims. (Cl. 262—33)

This invention relates to cutting assemblies in which links of a driven chain are provided with sockets, and in which cutting elements have shanks engaging in the sockets, and more particularly to improved structures for removably mounting cutting elements with respect to the chain.

As is well known, in mining machinery, cutter bits held in suitable sockets on links of a cutter chain, and driven by a powered sprocket engaged by the chain, are used in such operations as under-cutting the face of a seam or vein of coal. With respect to different sockets on the chain, the heads of the bits are generally arranged at different angles so that a width of cut may be obtained sufficient to ensure the clearing of the cutter chain and the cutter bar on which the chain runs. The cutting elements may have a variety of forms ranging from unitary integral elements comprising a shank and cutting head to more involved structures comprising a bit holder and a renewable cutting bit proper. It is to be understood that the present invention is not limited to the use of any particular type of cutting element and may include structures in which a separate cutting bit is engaged in an element having a shank which is held in the chain link socket. I shall, however, by way of example and for the sake of simplicity, describe my invention in connection with a unitary type of cutting bit having an integral shank, for engagement and retention in the chain socket, and a cutting head with a hard cutting insert forming a part thereof.

It will be understood that in mining machinery of this type, the cutting elements are subjected to rapid wear and abrasion as well as to extreme vibration. A problem arises in connection with holding the shank of the bit in its socket so as to resist loosening under vibration and the forces acting upon the cutting element during cutting operations. Furthermore, as the cutting head wears progressively, the gage decreases correspondingly, so that the cutting elements have to be renewed at frequent intervals unless some means can be provided to set the shank further out in its socket to compensate for the decrease in gage. Hitherto it has been a general practice to provide for holding the cutting element shank in its socket by means of one or more set screws. It will be readily realized that as a result, considerable time and labor is expended in renewing and replacing the cutting elements; in addition, the structures hitherto provided for setting a shank further out in its socket to obtain an additional increment of gage after wear has occurred and for holding the shank rigidly in this extended position have been unsatisfactory due to the above mentioned vibrational stresses and forces tending to displace the bit downwardly when in operation, or they have involved the use of separate pieces.

It is a primary object of this invention to provide a novel structure for the mounting of cutting element shanks in the sockets of cutter chains whereby the cutting elements are firmly held during the operation of the machine, but at the same time are easily and rapidly demountable for renewal and replacement of the cutting elements as hereinafter explained.

It is a further object of this invention to provide a novel structure for the mounting of cutting element shanks in the sockets of cutter chains whereby the shanks are adjustable as to position, so as to be capable of being extended in their sockets, thus providing an additional increment of service life, while at the same time the shanks are more securely held against movement.

It is an object of the invention to provide a novel structure having the above advantages but in which the cutter bit shank is not capable of being dislodged from the chain socket by forces acting in any direction, as, for example when the movement of the cutter chain is reversed.

These and other objects of my invention which will be set forth hereinafter, or will be apparent to one skilled in the art upon reading these specifications, I accomplish by that construction and arrangement of parts of which I shall now describe an exemplary embodiment. Reference is made to the accompanying drawings wherein:

Figure 1 is a partial cross-sectional view of a cutter chain link element including a cutter chain socket, showing an exemplary cutter bit in exploded relation thereto.

Figure 2 is a similar view showing the cutter bit and chain socket elements in assembled relationship.

Figure 3 is a perspective view of an adjustable locking element of a cutter chain socket.

Figure 4 is a perspective view showing a spring element forming part of the novel structure.

Figure 5 is a sectional view showing an exemplary operation of removing the spring element.

Figure 6 is a partial sectional view showing a mode of installing the spring element.

Figure 7 is a perspective view of another type of adjustable locking element.

Figure 8 is a plan view thereof.

Figure 9 is an elevational view of a spring having an engagement means hereafter described.

The sockets of a cutter chain are ordinarily formed on those chain elements or links which have two cheeks in spaced relationship. In Figures 1 and 2, I have shown in section a socket member 1 formed integrally with the cheeks of a double link element, a portion of one of the cheeks being shown at 2. As is well understood, in the cutter chain the various double link elements will be interconnected by single link elements (not indicated), the ends of the single link elements lying between the cheeks of the double link elements and being pivoted thereto by appropriate pintle means (not indicated). The details of the chain construction are outside the scope of this invention and hence should not be considered as forming a limitation thereupon.

The socket element 1 has a perforation or opening 3 to receive the shank 4 of a cutting element shown by way of example as having an integral head 5 with a hard cutting insert 6. This form of cutting element ordinarily will be made of hardened steel, the cutting insert 20 being a hard alloy such as Carboloy or the like.

The socket element 1 is provided with a plunger member 7 which extends through an aperture in either the forward or the rearward portion of the socket element. The plunger, shown here by way of example as extending through the rear portion 5 of the socket element, is spring pressed, and is of such length that a short portion of it protrudes from each face of the socket portion when in assembled relationship. The aperture in which the plunger is inserted is of suitable size to permit easy slidable movement of the plunger member therein. In the preferred form of the invention, where the plunger is employed adjustably to establish a plurality of positions of the shank of the cutting element, it is essential to provide means which will prevent the rotation of the plunger in the aperture. One way of preventing such rotation is to give to the plunger a non-circular cross-section, as in Figure 3, the aperture having a conforming shape. But rotation of the plunger in the aperture may be otherwise prevented as later set forth, and the aperture and plunger may, therefore, both have a circular cross-sectional shape. At its forward end the plunger has a detent 8 for a purpose hereinafter described; and at the rearward end it is provided with two notches or recesses 9 which engage bifurcated or forked portions of a spring member 10 shown alone in Figure 4.

The spring member 10 is in the form of an inverted J-shaped element conforming to the surface configuration of an end portion of the socket element 1. The spring element 10 is shaped to conform to the walls of the socket element, and since these walls may themselves vary in shape and disposition corresponding variations may be made in the parts of the spring member. In general, as shown in Figure 4, the spring member has what will be termed a front portion 11 adapted to lie within the recess 3 of the socket element. This front portion has a slightly inturned lower end indicated at 12. The spring element has a top portion 13 and an external leg portion 14 adapted to lie along the front or rear wall of the socket element. The lower end of the leg 14 is bifurcated as at 15 to provide parts separated by a slot so as to engage in the grooves or recesses 9 of the plunger 7.

The perforation 3 in the socket element is recessed at as 3a in such fashion as to bring the outer face of the front portion 11 of the spring flush with the corresponding inner wall of the perforation 3. The lower end of the recess 3a is relieved as at 3b to accept the inturned end 12 of the spring element.

It will be apparent from Figures 1 and 2 that when the spring element 10 is in position it is self-retaining because of the inturned portion 12 and the fact that the remaining portions of the spring closely embrace the corresponding wall portions of the socket element. A further means for retaining the spring in its final position may, if desired, be provided as shown in Figure 9. Here, like parts have been given like index numerals. The outer leg 14 of the spring element is provided with an inwardly extending boss or projection 24, which may be an attached member, but is most conveniently formed by indenting the outer leg of the spring. When the spring is in its final position, this boss engages in a correspondingly shaped recess in the outer surface of the socket member 1.

The spring can only be disengaged upon a flexure of its relative parts. Furthermore, when the spaced portions 15 of the spring engage the grooves 9 of the plunger or locking member 7 as shown in these figures, the plunger is also held in position with only its detent member 8 projecting into the perforation 3. The spring acts as a stop to prevent substantial further inward movement of the locking member; but the locking member is capable of movement in the opposite direction against the resilience of the spring.

The shank 4 of the cutter bit is formed with a notch 16 shaped to receive the detent 8 of the locking member; and the adjacent end portion of the bit shank is chamfered or beveled as at 17.

It will now be clear that when the shank 4 is inserted in the perforation 3 of the socket member and moved downwardly, the beveled portion 17 of the shank will first engage the detent 8 of the plunger, depressing the plunger against the resilience of the spring so as to permit further downward movement of the shank. Ultimately, showever, as shown in Figure 2 the detent 8 will pass the beveled portion of the shank and will snap into locking position in the notch 16. The parts of the cutter bit shank are preferably so configured that when this locking engagement occurs a shoulder 18 on the cutter bit will engage above the forward portion of the spring element, the plunger being in the position shown in Figures 1 and 2.

Thus, to install a cutter bit in a chain socket equipped with the spring and plunger of this invention all that is required is to insert the shank in the perforation 3 and drive the cutter bit downwardly as with a hammer or other impact means. To remove a cutter bit, the rear leg 14 of the spring 10 is flexed rearwardly so as to withdraw the plunger detent 8 from the perforation 3. To facilitate this a groove 19 may be formed in the contacted wall of the socket member, enabling the insertion of a prying device such for example as a screw driver 20 beneath the spring leg 14. When the detent has been withdrawn from the perforation 3 the shank of the cutter bit may be withdrawn forwardly. A withdrawal shoulder 21 may be formed on the cutter bit and the end of a curved tool may be engaged beneath this shoulder to pry the cutter bit shank from the socket, the top wall of the socket element being used as a fulcrum in this operation.

It will be noted in the various Figures that the detent 8 is preferably formed at one side only of the plunger or locking member 7. If the plunger is turned over, as shown in Figure 6, this will result in a new position of the detent 8 closer to the outer end of the socket member perforation 3. When the detent occupies this new position, the result of engaging the cutter bit shank in the socket member perforation will be to vary the gage of the cutting bit by extending its hard cutting point 6 further from the outer end of the socket member. This furnishes a simple and easy way of adjusting all of the cutter bits of a chain to a new position to compensate for wear. All that is necessary is to remove the cutter bits as aforesaid, reverse the various plungers, and reinsert the cutter bits. This does not require the employment of any extra elements, although it does not depart from the spirit of the invention to employ a washer-like shim surrounding the shank 4 of each cutter bit and filling the space between the cutter bit shoulder 18 and the top 13 of the spring, if desired. A further advantage of the arrangement herein described is that the adjustment of all cutter bits in a chain assembly is made equal without the use of any separate engaging device.

To reverse the plungers as aforesaid requires a disengagement of the bifurcations 15 of the spring from the grooves 9 of the plunger. This is readily accomplished by inserting the prying device 20 as described above and moving the rear leg 14 of the spring outwardly a substantially greater distance than is necessary merely to release the cutter bit shank. When this is done as illustrated in Figure 5 in solid lines, the spring tends to rock upwardly about the inturned end 12 as a pivot. This movement is continued until the bifurcations 15 of the spring are withdrawn from the groove 9 of the plunger. The top wall of the socket element may be grooved as at 22 so that a prying device may be inserted beneath the top portion 13 of the spring, and the spring removed in this fashion if desired. The position of the spring as disengaged is shown in dotted lines at 23 in Figure 5.

When the plunger has been released as described, it may then be withdrawn from the transverse hole in the socket member, turned over, and then reinserted. In the structure shown herein, the easiest way to re-engage the spring is to position it as shown in Figure 6 with the bifurcations 15 in the slots of the plunger. With the spring in the position shown, downward pressure or a blow from a hammer in the direction of the arrow will result in a seating of the spring in the final position illustrated in Figures 1 and 2.

In Figures 7 and 8 there is illustrated a plunger 25 having a circular cross-sectional shape and designed to operate in an aperture in the socket member which aperture also has a circular cross-section. The plunger is formed with a detent 26 at one end as shown. Near the other end there are provided opposed slots 27 and 28 in which the bifurcations 15 of the outer leg of the spring element can engage. It will be clear that this engagement will prevent the rotation of the plunger element in the aperture.

Beyond the opposed slots 27 and 28, the plunger of Figures 7 and 8 is shown as having an annular groove 29. This groove affords the opportunity of engaging the plunger directly by means of prying tools and moving it rearwardly. The prying tool may advantageously be forked in order to increase the positiveness of the engagement. This facilitates release of the cutter bit shank by withdrawal of the detent 26 from the socket aperture 3. It also facilitates complete disengagement of the spring from the plunger (substantially as described in connection with Figure 5 above) when it is desired to reverse and replace the plunger to adjust the gauge.

It will be understood that when the cutter bit shank is installed in the socket member as hereinabove described, it will be held against movement in any direction by the combined engagement of the front, rear and side edges of the shank with the corresponding walls of the perforation 3 in the socket member, and by the engagement of the detent 8 in the notch 16. The primary forces exerted on cutter bits in mining machines of the type referred to are longitudinal and transverse forces as referred to the direction of movement of the cutter chain links. These forces are resisted by the engagement of the shank of the cutter bit with the walls of the socket member perforations. The engagement of the detent 8 in the notch 16 is sufficient to sustain forces directed along the axis of the cutter bit shank; but it will be evident that where the cutter bit has a shoulder 18 contacting the spring, the top of the socket member, or an interposed shim, the detent can be substantially relieved of shearing stresses.

While structures have been shown and described herein in which the socket element closely fits the shank of the cutter bit and in which endwise movement of the cutter bit shank in the socket element is resisted by the detent means, and in which the detent means affords opportunity for the adjustment of gauge, the principles of the invention will not be avoided by the use of additional holding means if desired. For example, the practice of this invention does not preclude the additional use of conventional set screw holding means. Additional holding means are desirable in the event the cutter bit shank does not reasonably closely fit the aperture in the socket member; and bits with undersized shanks may be employed through the use of set screws, shims, or resilient members. Such additional means however, form no essential limitation on the invention herein described and claimed and, therefore, have not been illustrated.

The spring members in the form shown are not readily liable to breakage from external forces because the parts of the operating spring are backed up by the metal of the socket member. The springs, being relatively thin metal elements, may have their service life shortened by the action of corosive mine waters. If this occurs, the spring members are readily and inexpensively replaced.

Modifications may be made in the invention without departing from the spirit of it. By way of example, it has been mentioned above that the plunger member may be located at any position in either the front or rear portion of the socket element, provided, of course, that the configuration of the beveled portion and transverse notch of the cutter bit shank are varied in a corresponding manner to engage cooperatively therewith. It is within the spirit of the invention to vary the offset of the detent or the size of the plunger member so as to permit a relatively smaller or larger adjustment in gauge when the plunger is reversed.

Having thus described the invention in an exemplary embodiment, what I claim as new and desire to secure by Letters Patent is:

1. In a cutter chain assembly, a socket member having a transverse opening forming a socket, a cutting element having a shank to be received in said socket, latch means in the form of a plunger for holding said shank in seated position extending through a longitudinal opening in a wall of said socket member and resilient means for holding said latch means in engaged position with said shank whereby to resist endwise withdrawal of said shank, said resilient means having releasable resilient engagement with said socket member and releasable resilient engagement with said latch means.

2. The structure claimed in claim 1 wherein said latch means is a plunger member having a detent at one end thereof adapted to enter a transverse notch in an abutting face of said shank when said shank is in seated position, said shank having its outer end beveled whereby to depress said latch as said shank is caused to enter said socket, said cutting element having a shoulder at the inner end of said shank for abutting the socket element when said shank is fully seated, to resist endwise cutting stresses.

3. The structure claimed in claim 1 wherein said latch means is a plunger member having adjacent one end thereof opposed grooved recesses adapted for engagement with said resilient means, said resilient means having a bifurcated engaging portion external to said socket member.

4. The structure claimed in claim 3 wherein said resilient means comprises a substantially J-shaped leaf spring member having at one end thereof a hook-like protrusion adapted to be engaged in a cooperating depression in a wall of said opening of said socket member and having at the other end thereof said bifurcated portion.

5. The structure claimed in claim 4, wherein the engagement of the bifurcated portion of said resilient means with the said opposed grooved recesses in said plunger prevents rotation of said plunger.

6. The structure claimed in claim 4, wherein the engagement of the bifurcated portion of said resilient means with the said opposed grooved recesses in said plunger prevents rotation of said plunger, said plunger being otherwise rotatable in said longitudinal opening, and wherein said plunger has a detent on its end opposite said grooved recesses and wherein said detent is offset with respect to the axis of said plunger.

7. The structure claimed in claim 4, wherein the engagement of the bifurcated portion of said resilient means with the said opposed grooved recesses in said plunger prevents rotation of said plunger, said plunger being otherwise rotatable in said longitudinal opening, and wherein said plunger has a detent on its end opposite said grooved recesses and wherein said detent is offset with respect to the axis of said plunger, and wherein said plunger beyond said grooved recesses has means for engagement with a prying tool.

8. The structure claimed in claim 4 wherein a portion of said spring member adjacent said hook-like protrusion lies along at least a portion of said opening in said socket member and serves as an abutment for at least part of one face of said shank, the remaining portions of said spring member lying along outer surfaces of said socket member, said spring member tending to press inwardly in three directions against said opening and the said outer surfaces of said socket member.

9. The structure claimed in claim 8 wherein said bifurcated portions of said spring member are adapted to engage said opposed grooved recesses adjacent one end of said plunger whereby to press said plunger inwardly, a detent on the opposite end of said plunger, and a transverse notch cooperating with said detent on an abutting face of said shank when said shank is in seated position.

10. The structure claimed in claim 8 wherein one at least of said outer surfaces of said socket member contains a transverse groove underlying said spring member when in assembled relationship and terminating outwardly of each edge thereof whereby to permit said spring member to be flexed outwardly from said outer surface by external lever means and to permit disengagement of said latch means from said shank, whereby to permit endwise withdrawal of said shank.

11. In a cutter chain assembly, a member having a socket forming opening, a cutting element having a shank, latch means for holding said shank in seated position, said latch means comprising a slidable plunger member extending longitudinally through an aperture in one portion of said socket member and having a detent at one end thereof adapted to enter a transverse notch across an abutting face of said shank when said shank is in seated position, said detent being offset with respect to the face of said plunger member and having a cross sectional area substantially less than a transverse cross sectional area of said plunger member, means fixing the rotary position of said plunger member in said aperture, and means external to said socket member having resilient detachable connection therewith and acting to urge said plunger to engaged position.

12. The structure claimed in claim 11 wherein said plunger member may be withdrawn from said portion of said socket member and reinserted in inverted position therein, said offset detent thereby being disposed to enter said transverse notch of said shank when said shank is in partially extended position with respect to said socket whereby to obtain an increased increment of gage after said cutting element has been subjected to wear.

13. The structure claimed in claim 12 wherein said plunger member has opposed notched recesses adjacent the end opposite from said detent, said recesses lying outside the outer face of said portion of said socket member and being adapted to be engaged between bifurcated portions of said spring member, said offset detent being thereby pressed into latching engagement with said transverse notch across said abutting face of said shank when said shank is in partially extended position with respect to said socket whereby to resist endwise withdrawal of said shank.

14. In combination in a cutter chain assembly, a socket member having a transverse socket forming opening therein, a cutting element having a shank engageable in said opening, said shank having a beveled lower portion on one face and a transverse substantially parallel sided notch thereabove in said face, latch means in the form of a plunger extending through a longitudinal aperture in a wall of said socket member, said latch means having on one end a substantially parallel sided detent adapted to enter said notch in said shank to prevent longitudinal movement of said shank in said socket forming opening in either direction, and resilient means for urging said plunger toward said socket forming opening whereby to hold said detent in engagement with said transverse notch in said shank, said detent being offset with respect to the axis of said plunger so that, depending upon the angular position of said plunger in said aperture, said detent is capable of fixing said shank in alternative longitudinal positions in said socket forming opening.

15. The combination claimed in claim 14 wherein said resilient means is a flat spring element having an end entering the opening in said socket member and other portions conforming to the outer surface of two wall portions of said socket member, one of said spring portions having engagement with an end of said plunger.

16. In a cutter chain assembly a socket member having a transverse opening therein to receive a cutter bit shank, said socket member having an intersecting longitudinal opening through one of its walls, said last mentioned opening having a non-circular cross section, a plunger of similar cross section slidably mounted in said last mentioned opening, said plunger having a parallel sided detent offset from the axis of said plunger and adapted to project within said first mentioned opening for engaging a parallel sided notch in a cutter bit shank, and resilient means for urging said plunger into engaging position, said plunger being capable of withdrawal from said second mentioned opening and reinsertion therein in an indexed position whereby said detent is brought to a different position within said first mentioned opening.

17. The structure claimed in claim 16 wherein said resilient means is a leaf spring element having engagement with said plunger and having portions located externally of the walls of said socket member lying in close conformity thereto when said plunger is in the engaging position.

References Cited in the file of this patent

UNITED STATES PATENTS

| | | |
|---|---|---|
| 1,027,579 | Wright | May 28, 1912 |
| 1,375,638 | Krenzle | Apr. 19, 1921 |
| 1,468,866 | Morgan | Sept. 25, 1923 |
| 1,753,441 | Morehouse | Apr. 8, 1930 |
| 1,809,237 | Halborg | June 9, 1931 |
| 1,966,720 | Henning | July 17, 1934 |
| 2,521,089 | Phipps | Sept. 5, 1950 |
| 2,613,069 | Bruestle | Oct. 7, 1952 |

FOREIGN PATENTS

| | | |
|---|---|---|
| 549,892 | Great Britain | Dec. 11, 1942 |